United States Patent [19]

Dawson et al.

[11] 3,907,846

[45] Sept. 23, 1975

[54] PREPARATION OF SUBSTITUTED DECENOIC ACIDS

[75] Inventors: William Dawson, Camberley; Michael John Foulis, Binfield; Norman James Albert Gutteridge, Owlsmoor; Colin William Smith, Bracknell, all of England

[73] Assignee: Lilly Industries, Ltd., London, England

[22] Filed: Apr. 10, 1974

[21] Appl. No.: 459,830

[30] Foreign Application Priority Data
Apr. 12, 1973 United Kingdom............... 17734/73

[52] U.S. Cl............ 260/408; 206/410.9 R; 206/413
[51] Int. Cl.²......................................... C11C 3/02
[58] Field of Search.............. 260/410.9 R, 408, 413

[56] References Cited
UNITED STATES PATENTS

| | | | |
|---|---|---|---|
| 3,156,714 | 11/1974 | Surmatis | 260/410.9 R |
| 3,329,694 | 7/1967 | Martel | 260/410.9 R |
| 3,716,631 | 2/1973 | Steggerder | 260/410.9 R |
| 3,767,695 | 10/1973 | Pike | 260/410.9 R |

Primary Examiner—Patrick P. Garvin
Assistant Examiner—John F. Niebling
Attorney, Agent, or Firm—Steven R. Lammert; James L. Rowe; Everet F. Smith

[57] ABSTRACT

The invention provides 7-hydroxy-5,8-dioxo-10-phenyldec-9-enoic acid and salts and esters thereof useful as intermediates in the preparation of styryl cyclopentenyl propanoic acids having spasmolytic activity. Also provided is a process for preparing the phenyldec-9-enoic compounds by reaction of 3-oxoheptane-1,7-dioic acid with styryl glyoxal.

7 Claims, No Drawings

PREPARATION OF SUBSTITUTED DECENOIC ACIDS

This invention relates to the preparation of a novel substituted decenoic acid and derivatives thereof useful in the preparation of pharmacologically active compounds.

According to the present invention, there is provided the novel compound 7-hydroxy-5,8-dioxo-10-phenyl-dec-9-enoic acid of structure:

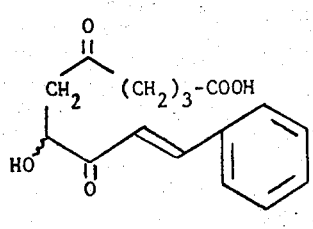

and salts and esters thereof. Preferred salts are the alkali metal salts whilst preferred esters are the $C_{1-4}$ alkyl and halo-$C_{1-4}$ alkyl esters.

The compound of formula I may be prepared in accordance with another aspect of the present invention by reaction of 3-oxoheptane-1,7-dioic acid with styryl glyoxal, the latter preferably being in the form of its hemihydrate. The reaction is normally carried out in an aqueous medium under acidic or basic conditions. The reaction proceeds smoothly at room temperature and is usually complete within from 12 to 48 hours. The product may be isolated from the reaction medium by evaporation and if desired purified for example by column chromatography.

The resultant compound of formula I is obtained in racemic form due to the presence of an asymmetric centre at the C7-position. If desired, this racemate can be separated into its optical antipodes which form a part of this invention. Separation is accomplished by conventional methods, for example, diastereoisomers may be formed from the racemic mixture by reaction with an optically active amine such as (—)ephedrine or (+)- and (—)-α-methylbenzylamine, the difference in the solubility of the diastereoisomers obtained permitting selective re-crystallisation of one form and regeneration of the optically active acid of formula I from the mixture.

The salts and esters of the acid of formula I are also formed by conventional means. Thus a salt, either of the racemic or optically active form of the acid, is prepared by reaction with an appropriate base, for example an alkali metal hydroxide, carbonate or hydrogen carbonate. Esters of the racemic or optically active forms of the acid of formula I are prepared by reaction of the acid with an appropriate esterification agent such as a $C_{1-4}$ diazoalkane, a $C_{1-4}$ alcohol or $C_{1-4}$ haloalcohol.

As stated above, the compound of formula I, whether in racemic or optically active form, and salts and esters thereof, are useful as intermediates in the preparation of pharmacologically active compounds. Thus, for example, they may be cyclised by treatment with a base to yield a racemic or optically active styryl cyclopentenyl propanoic acid of the formula:

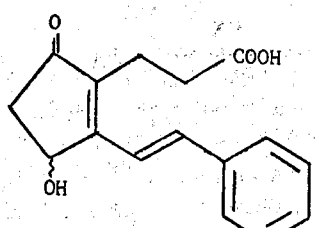

or a salt or ester thereof depending on the starting material used. The compounds of formula II are useful as spasmolytic agents and they, together with certain related compounds, are more fully described in the specification of our co-pending U.S. application Ser. No. 459,831 filed concurrently herewith.

The following Examples will further illustrate the preparation of the novel compounds of formula I and their conversion to therapeutically useful compounds of formula II

EXAMPLE 1

3-Oxoheptane-1,7-dioic acid (1.0 g.) was dissolved in water (5 ml.) and treated with styryl glyoxal hemihydrate (0.97 g.). The mixture was adjusted to pH9 with 1M sodium hydroxide and stirred for 16 hours, after which it was filtered, the filtrate acidified to pH2 with 1M hydrochloric acid and then extracted with ethyl acetate. The extract was dried over anhydrous sodium sulphate and rotary evaporated to an oil. After purification by chromatography on a silica gel column using chloroform as eluant, 7-hydroxy-5,8-dioxo-10-phenyl-dec-9-enoic acid, m.p. 99°C. (1.33 g.) was obtained as a crystalline solid. The latter, upon treatment with methanol in the presence of p-toluene sulphonic acid, yielded the corresponding methyl ester, m.p. 57°C. Similarly, using 2,2,2-trichloroethanol, the corresponding 2,2,2-trichloroethyl ester was obtained.

The starting materials for the foregoing reaction were prepared as follows:

3-Oxoheptane-1,7-dioic acid

Diethyl 3-oxoheptane-1,7-dioate (23 g.) at 5°C. was treated with 5M sodium hydroxide (50 ml.) at a rate such that the temperature did not exceed 10°C. After stirring for a further hour, the reaction mixture was stood at 0°C. for 24 hours. The solution was acidified (ph2) with concentrated hydrochloric acid (50 ml.) and extracted with ethyl acetate. The extract was dried over anhydrous sodium sulphate and rotary evaporated to an oil. Addition of sufficient ether and petroleum ether (b.p. 60°- 80°C.) to the oil to produce turbidity, and cooling to 0°C. yielded the desired acid (7.11 g.), m.p. 80°- 82°C. (dec.).

Styryl glyoxal hemihydrate

Selenium dioxide (427 g.), water (140 ml.) and tetrahydrofuran (2.5 l.) were heated to reflux. Benzal acetone (567 g.) was slowly added with stirring and heating to allow gentle refluxing of solution. After three hours the mixture was allowed to cool to room temperature and was kept at this temperature overnight. The mixture was filtered to remove deposited selenium, the filtrate was concentrated by evaporation to a viscous oil and extracted with boiling water (15 l.). The stirred aqueous extract deposited the required compound on cooling. Yield 174 g., m.p. 88° - 90°C.

EXAMPLE 2

7-Hydroxy-5,8-dioxo-10-phenyldec-9-enoic acid (0.20 g.) was dissolved in 0.1M sodium hydroxide (17.5 ml.) at room temperature. The solution was stirred for 45 minutes, acidified with 0.1M hydrochloric acid (19.5 ml.) and extracted with ethyl acetate. The organic phase was washed with brine, dried over anhydrous magnesium sulphate and evaporated to an oil which, upon trituration with cold ethyl acetate, yielded crystals of 3-[3-hydroxy-5-oxo-2-(β-styryl)cyclopent-1-enyl]propanoic acid, m.p. 191°C; phenylhydrazone derivative, m.p. 200° - 204°C. (dec.); methoxime derivative, m.p. 184° - 185°C.

Using the foregoing method, but commencing with methyl 7-hydroxy-5,8-dioxo-10-phenyldec-9-enoate, there was obtained methyl 3-[3-hydroxy-5-oxo-2-(β-styryl)cyclopententyl]propanoate, m.p. 80°C.

We claim:

1. A compound selected from the group consisting of 7-hydroxy-5,8-dioxo-10-phenyldec-9-enoic acid of the formula

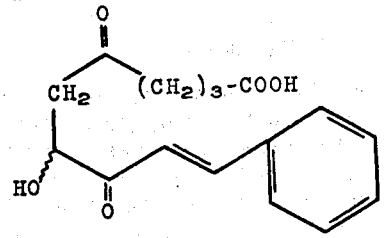

its alkali metal salt,
its $C_{1-4}$ alkyl ester, and
its $C_{1-4}$ haloalkyl ester.

2. The $C_{1-4}$ alkyl or $C_{1-4}$ haloalkyl ester according to claim 1.

3. The sodium or potassium salt according to claim 1.

4. A method of preparing a compound of claim 1, which comprises reacting 3-oxoheptane-1,7-dioic acid with styryl glyoxal to form a racemic mixture of the optically-active isomers of 7-hydroxy-5,8-dioxo-10-phenyldec-9-enoic acid, and thereafter, optionally:

a. separating the racemic mixture into one or other of the component optically-active isomers by first forming diastereoisomers from the racemic mixture by reaction with an optically active amine, selective recrystallization of one diastereoisomeric form, and regeneration of the optically active acid, and/or b. esterifying the 7-hydroxy-5,8-dioxo-10-phenyldec-9-enoic acid with a $C_{1-4}$ diazoalkane, a $C_{1-4}$ alcohol or a $C_{1-4}$ haloalcohol to form a $C_{1-4}$ alkyl or $C_{1-4}$ haloalkyl ester, and/or c. salifying the acid to form an alkali metal salt.

5. A method according to claim 4, wherein the reaction between the 3-oxoheptane-1,7-dioic acid and the styryl glyoxal is carried out in an aqueous medium.

6. A method according to claim 4, wherein the styryl glyoxal is utilised in the form of its hemihydrate.

7. The compound of claim 1, said compound being 7-hydroxy-5,8-dioxo-10-phenyldec-9-enoic acid.

* * * * *